US012732982B2

(12) United States Patent
Yu

(10) Patent No.: US 12,732,982 B2
(45) Date of Patent: Sep. 8, 2026

(54) METHOD OF PERFORMING NON-CODEBOOK BASED PHYSICAL UPLINK SHARED CHANNEL TRANSMISSION AND RELATED DEVICE

(71) Applicant: SHARP KABUSHIKI KAISHA, Sakai City (JP)

(72) Inventor: Chia-Hao Yu, Taipei (TW)

(73) Assignee: SHARP KABUSHIKI KAISHA, Sakai City (JP)

(*) Notice: Subject to any disclaimer, the term of this patent is extended or adjusted under 35 U.S.C. 154(b) by 801 days.

(21) Appl. No.: 17/916,349

(22) PCT Filed: Apr. 9, 2021

(86) PCT No.: PCT/CN2021/086046

§ 371 (c)(1),
(2) Date: Sep. 30, 2022

(87) PCT Pub. No.: WO2021/204225

PCT Pub. Date: Oct. 14, 2021

(65) Prior Publication Data

US 2023/0143852 A1 May 11, 2023

Related U.S. Application Data

(60) Provisional application No. 63/008,571, filed on Apr. 10, 2020, provisional application No. 63/008,576, filed on Apr. 10, 2020.

(51) Int. Cl.

| | |
|---|---|
| ***H04W 72/044*** | (2023.01) |
| ***H04L 5/00*** | (2006.01) |
| ***H04W 72/232*** | (2023.01) |

(52) U.S. Cl.
CPC ......... *H04W 72/046* (2013.01); *H04L 5/0051* (2013.01); *H04W 72/232* (2023.01)

(58) Field of Classification Search
CPC .............. H04W 72/046; H04W 72/232; H04L 5/0051; H04B 7/0456; H04B 7/0617; H04B 7/0691; H04B 7/0404
See application file for complete search history.

(56) References Cited

U.S. PATENT DOCUMENTS

2019/0320469 A1 10/2019 Huang et al.
2020/0100232 A1* 3/2020 Onggosanusi ...... H04W 72/046
(Continued)

FOREIGN PATENT DOCUMENTS

CN 110536452 A 12/2019

OTHER PUBLICATIONS

Nokia, Nokia Shanghai Bell, Enhancements on Multi-beam Operation, 3GPP TSG RAN WG1 Meeting #AH-1901, Taipei, Taiwan, Jan. 21-25, 2019, R1-1900692 (Year: 2019).*
(Continued)

*Primary Examiner* — Charles C Jiang
(74) *Attorney, Agent, or Firm* — ScienBiziP, P.C.

(57) ABSTRACT

A method of performing a non-codebook based physical uplink shared channel (PUSCH) transmission by a user equipment (UE) is provided. The method includes receiving, from a base station (BS), first downlink control information (DCI) including a transmission configuration indication (TCI) field that indicates a source reference signal (RS) for providing transmission beam information to the UE, receiving, from the BS, second DCI including a sounding reference signal (SRS) resource indication (SRI) field that indicates an SRS resource in an SRS resource set with usage set to non-codebook (SRS-nCB) resource set for providing precoding information to the UE, and performing the non-codebook based PUSCH transmission according to the transmission beam information and the precoding information.

12 Claims, 11 Drawing Sheets

(56) References Cited

U.S. PATENT DOCUMENTS

2022/0116965 A1* 4/2022 Park ...................... H04L 5/0048
2022/0330293 A1* 10/2022 Matsumura ........... H04W 72/23
2023/0261723 A1* 8/2023 Hakola ............. H04B 7/06966 370/330

OTHER PUBLICATIONS

Enhancements on Multi-beam Operation, Nokia, 3GPP TSG RAN WG1 meeting, #AH-1001, R1-1900692. See IDS filed Jun. 19, 2024 . (Year: 2019).*

3GPP TS 38.213 V15.6.0 (Jun. 2019), 3rd Generation Partnership Project; Technical Specification Group Radio Access Network; NR; Physical layer procedures for control (Release 15).

3GPP TS 38.212 V16.0.0 (Dec. 2019), 3rd Generation Partnership Project; Technical Specification Group Radio Access Network; NR; Multiplexing and channel coding (Release 16).

3GPP TS 38.214 V15.9.0 (Mar. 2020), 3rd Generation Partnership Project; Technical Specification Group Radio Access Network; NR; Physical layer procedures for data (Release 15), Apr. 3, 2020 (Apr. 3, 2020), section 6.1.1.2.

3GPP TS 38.214 V15.6.0 (Jun. 2019), 3rd Generation Partnership Project; Technical Specification Group Radio Access Network; NR; Physical layer procedures for data (Release 15), Jun. 24, 2019 (Jun. 24, 2019), sections 9.1.2.2, 9.1.3.2.

Nokia et al: "Enhancements on Multi-beam Operation", 3GPP Draft; R1-1900692, 3GPP TSG RAN WG1 Meeting #AH-1901, Taipei, Taiwan, Jan. 21-25, 2019 (Jan. 20, 2019), p. 3, paragraph 4-paragraph 6; figure 1.

* cited by examiner

```
UL-TCI-State ::=            SEQUENCE {
        UL-TCI-State-Id,
        servingCell-Id
        beam-referenceSignal    CHOICE  {
                ssb-Index
                csi-rs-Index
                srs             SEQUENCE {
                        resourceId
                        uplinkBWP
                }
        }
}
```

FIG. 1

```
srs-spatailRelationInfo ::=   SEQUENCE {
        servingCell-Id
        referenceSignal    CHOICE  {
                ssb-Index
                csi-rs-Index
                srs             SEQUENCE {
                        resourceId
                        uplinkBWP
                }
        }
}
```

FIG. 4

METHOD OF PERFORMING NON-CODEBOOK BASED PHYSICAL UPLINK SHARED CHANNEL TRANSMISSION AND RELATED DEVICE

CROSS-REFERENCE TO RELATED APPLICATION(S)

The present disclosure is the National Stage of International Patent Application No. PCT/CN2021/086046, filed on Apr. 9, 2021, entitled "METHOD OF PERFORMING NON-CODEBOOK BASED PHYSICAL UPLINK SHARED CHANNEL TRANSMISSION AND RELATED DEVICE," which claims the benefit of and priority to U.S. Provisional Patent Application Ser. No. 63/008,571, filed on Apr. 10, 2020, entitled "CODEBOOK BASED PUSCH BEAM INDICATION BASED ON TRANSMISSION CONFIGURATION INDICATION,", and U.S. Provisional Patent Application Ser. No. 63/008,576, filed on Apr. 10, 2020, entitled "NON-CODEBOOK BASED PUSCH BEAM INDICATION BASED ON TRANSMISSION CONFIGURATION INDICATION." The contents of all of above-mentioned applications are hereby incorporated herein fully by reference into the present disclosure.

FIELD

The present disclosure is generally related to wireless communications, and more specifically, to a method of performing a non-codebook based physical uplink shared channel (PUSCH) transmission and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR) system, by improving data rate, latency, reliability, and mobility.

The 5G NR system is designed to provide flexibility and configurability for optimizing the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of performing a non-codebook based physical uplink shared channel (PUSCH) transmission and a related device.

According to an aspect of the present disclosure, a method of performing a non-codebook based physical uplink shared channel (PUSCH) transmission by a user equipment (UE) is provided. The method includes receiving, from a base station (BS), first downlink control information (DCI) including a transmission configuration indication (TCI) field that indicates a source reference signal (RS) for providing transmission beam information to the UE, receiving, from the BS, second DCI including a sounding reference signal (SRS) resource indication (SRI) field that indicates an SRS resource in an SRS resource set with usage set to non-codebook (SRS-nCB) resource set for providing precoding information to the UE, and performing the non-codebook based PUSCH transmission according to the transmission beam information and the precoding information.

According to another aspect of the present disclosure, a UE for performing a non-codebook based physical uplink shared channel (PUSCH) transmission is provided. The UE includes at least one processor, and at least one memory coupled to the at least one processor, the at least one memory storing computer-executable instructions that, when executed by the at least one processor, cause the UE to perform the above-disclosed method of performing the non-codebook based PUSCH transmission.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 1 is a diagram illustrating a structure of an uplink transmission configuration indication state (UL-TCI-State) information element (IE), according to an implementation of the present disclosure.

FIG. 4 is a diagram illustrating an srs-spatialRelationInfo IE, according to an implementation of the present disclosure.

DESCRIPTION

Figure 2:
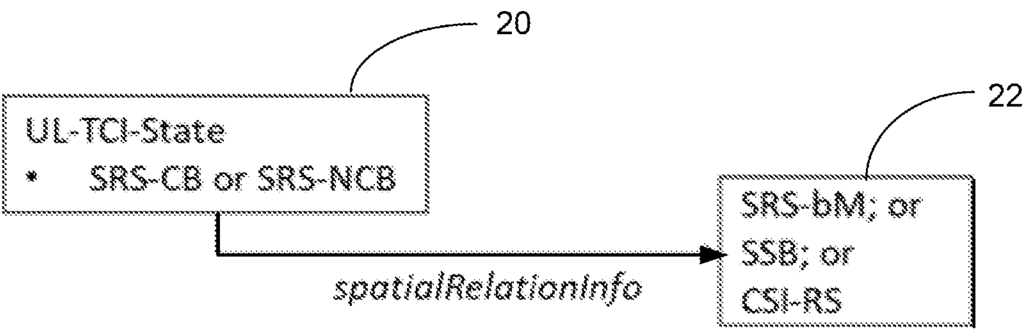
FIG. 2 is a diagram illustrating a recursive source reference signal (RS) indicated by a spatialRelationInfo IE, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

UL Transmission Configuration Indication (TCI) State for Spatial Filter/Beam Information UL TCI signaling, which may be similar to the DL TCI specified in the 3GPP Rel-15/16 for DL transmission beam information, is used for UL beam indication and optionally UL panel indication. FIG. 1 is a schematic diagram illustrating a structure of an uplink transmission configuration indication state (UL-TCI-State) information element (IE), according to an implementation of the present disclosure. In the present disclosure, an UL-TCI-State IE may be also referred to as UL-TCI-State.

As illustrated in FIG. 1, the UL-TCI-State IE includes the following information:

1. a UL-TCI-state identity (e.g., UL-TCI-State-Id) for identifying the UL-TCI-State among others.
2. a serving cell identity (e.g., servingCell-Id) for indicating a serving cell where a source RS provided in this UL-TCI-state IE comes from.
3. A source reference signal (RS) (e.g., beam-referenceSignal) is a beam reference RS. The source RS provides a spatial filter reference (e.g., beam information) for transmitting a target RS/channel (e.g., physical uplink shared channel (PUSCH)). The source RS may further include information of at least one of Synchronization Signal (SS)/Physical Broadcast Channel (PBCH) block index (e.g., ssb-Index), channel state information reference signal (CSI-RS) index (e.g., csi-rs-Index), and sounding reference signal (SRS) information (e.g., srs). The SRS information may further include SRS resource index (e.g., resourceId) and UL bandwidth part (BWP) index (e.g., uplinkBWP).

An SRS resource set may be configured to one of the following usages: SRS-beamManagement (SRS-bM), SRS-codebook (SRS-CB), SRS-nonCodebook (SRS-nCB) and antennaSwitching. An SRS resource of the SRS resource set with its associated usage set to SRS-CB or SRS-nCB may not be used as a root source RS for providing transmission beam information. This may be applied at least in frequency range 2 (FR2) where spatial filter information or beam information is crucial for proper operation.

It is noted that although the signaling content of a "UL-TCI-State" may be similar to "spatialrelationInfo" configured by an RRC, the signaling method for the UL-TCI-State is different from that of the spatialrelationInfo. Similar to DL TCI, the UL-TCI-State may provide different Quasi-Co-Location (QCL) types for UL transmissions. In one method, the UL-TCI-State may include QCL-type spatial-relation and the content may include parameters illustrated in FIG. 1. The terms, "UL-TCI," "UL TCI," and "UL-TCI-State," stand for signaling method and content used to provide at least transmission beam information that is used to be provided by spatialRelationInfo of the 3GPP Rel-15/16.

In one implementation, panel information is provided along with the UL-TCI-State.

A source RS may be indicated by a UL-TCI-State IE (e.g., beam-referenceSignal as illustrated in FIG. 1. The source RS provides information on a spatial filter to be applied for transmitting a target RS or a target channel. A UL-TCI-State IE may further provide information on UE panel for transmission if multiple active UE panels are supported between the UE and a gNB. For additionally providing UE panel information in the UL-TCI-State, two options are disclosed.

Option 1. Panel information is provided by an explicit RRC parameter.

In one example, an RRC parameter is included in the UL-TCI-State.

In other examples, an RRC parameter is provided per SRS resource set. For SRS resources in the same SRS resource set, the same RRC parameter applies for all SRS resources of the SRS resource set.

Option 2. Panel information is associated with the UL-TCI-State IE.

In one example, the UE associates SRS resource sets with different UE panels. The association is performed by the UE during beam training phase and subsequent transmissions based on the beam training phase, at least for a period of time. When a UL-TCI-State is indicated, a UE panel is derived by its associated SRS resource set that includes the source RS indicated by the UL-TCI-State. It is noted that the association may be greater than 1-hop association. For example, a UL-TCI-State indicates a source RS with an SRS resource set whose usage is set to 'beamManagement' (e.g., SRS-bM resource set). Therefore, a UE panel is derived based on the associated SRS resource set (e.g., SRS-bM resource set).

In other examples, the UE associates different resources with different UE panels. The resource may be a DL RS (e.g., an SSB or a CSI-RS resource). The association is performed by the UE during the beam training phase and subsequent transmissions based on the beam training phase. When a UL-TCI-State is indicated, a UE panel is derived by the source RS indicated by the UL-TCI-State. For example, a UL-TCI-State indicates a source RS with an SSB or a CSI-RS resource. Therefore, a UE panel is derived based on the associated SSB or CSI-RS resource.

In one implementation, a recursive source RS is disclosed. The UL-TCI-State IE in FIG. 1 indicates a source RS for providing transmission beam information (as well as panel indication, optionally) for PUSCH transmission. In a case that a source RS is an SRS resource whose usage is set to SRS-CB or SRS-nCB, the source RS may not provide spatial filter information or transmission beam information directly.

The source RS may further provide spatial filter information or transmission beam information via an RRC IE.

In one example, the RRC IE may include spatialRelationInfo. FIG. 2 is a schematic diagram illustrating a recursive source reference signal (RS) indicated by a spatialRelationInfo IE, according to an implementation of the present disclosure. In the present disclosure, a spatialRelationInfo IE may be also referred to as spatialRelationInfo. The spatialRelationInfo provides a resource RS 22, which may be an SSB, a CSI-RS or an SRS resource for beam indication. The SRS resource may include SRS-bM. The SRS resource provided in spatialRelationInfo as the initial (or root) source RS 20 can be neither SRS-CB nor SRS-NCB. It is noted that the initial source RS 20 is considered as an RS whose spatial domain filter does not refer to other RS.

Figure 3:
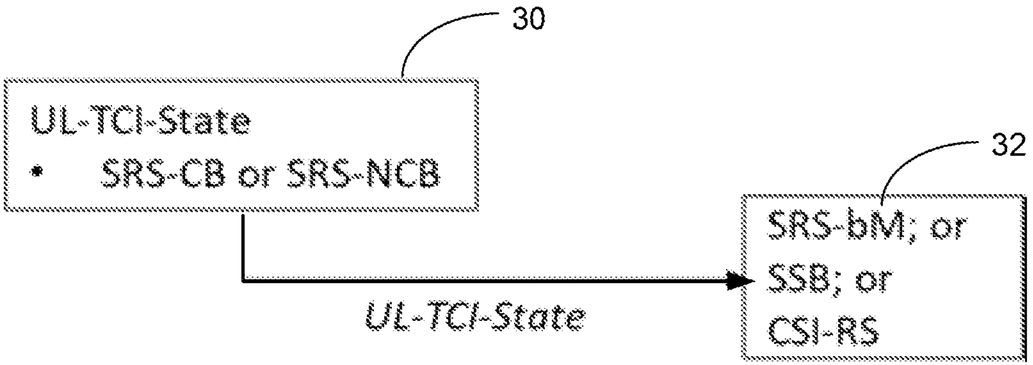
FIG. 3 is a diagram illustrating a recursive source RS indicated by a UL-TCI-State IE, according to an implementation of the present disclosure.

In other examples, the RRC IE may include UL-TCI-State. FIG. 3 is a schematic diagram illustrating a recursive source RS indicated by a UL-TCI-State IE, according to an implementation of the present disclosure. The UL-TCI-State IE provides a resource RS 32, which may include an SSB, a CSI-RS or an SRS resource for beam indication. The SRS resource may be SRS-bM. The SRS resource provided in UL-TCI-State as the initial (or root) source RS 30 can be neither SRS-CB nor SRS-NCB. It is noted that the initial source RS 30 is considered as an RS whose spatial domain filter does not refer to other RS.

In a case that a source RS is a DL RS, the UE may transmit a target RS/channel by using the same spatial filter/beam as for a reception of the DL RS.

FIG. 4 is a schematic diagram illustrating an srs-spatialRelationInfo IE, according to an implementation of the present disclosure. FIG. 4 illustrates an example implementation of a spatialRelationInfo IE based on the 3GPP Rel-15/16. The referenceSignal of the srs-spatialRelationInfo IE provides a source RS with SRS-CB or SRS-NCB as illustrated in FIG. 2. If an SRS resource is selected as referenceSignal, the SRS resource may be restricted to SRS-bM. Similarly, if a UL-TCI-State IE is used for the recursive resource RS as mentioned above in FIG. 3 and an SRS resource is selected as a beam-referenceSignal in FIG. 1, the SRS resource may be restricted to SRS-bM.

UL-TCI Based Indication for Non-Codebook Based PUSCH Transmission

Two transmission schemes or modes are supported for PUSCH as specified in the 3GPP TS 38.213 V15.6.0 and TS 38.214 V15.6.0: codebook based transmission and non-codebook based transmission. For both transmission modes, a PUSCH transmission may be scheduled by DCI format 0_1 or DCI format 0_2, as specified in the 3GPP TS 38.212 V16.0.0.

For the non-codebook based transmission scheme, a scheduling DCI may provide, among others, information on UL transmission beam, transmit precoding matrix index (TPMI), and the number of spatial layers used for the PUSCH transmission. The transmission beam information is provided via spatial relation information in 3GPP Rel-15/16. A TPMI may notify transmit precoder to be applied for a scheduled PUSCH transmission.

With UL-TCI based indication as mentioned above, two methods for non-codebook based PUSCH transmission are disclosed as follows:

Method 1. A source RS indication for non-codebook based PUSCH transmission.

In this method, an SRS resource indication (SRI) field in a scheduling DCI (e.g., DCI format 0_1 or 0_2) is used to provide information on TPMI(s) and the number of spatial layers, and a UL-TCI field in a scheduling DCI (e.g., DCI format 0_1 or 0_2) is used to provide transmission beam information. In one example, the SRI filed and the UL-TCI field are provided by different scheduling DCIs.

The UL-TCI field provides an indication to a UL-TCI-State. The SRI field provides an indication to SRS-nCB resource(s).

The UL-TCI-State IE provides a source RS for deriving transmission beam information. A UE panel used for the scheduled PUSCH transmission may be indicated, optionally or implicitly by the UL-TCI-State IE. The source RS may be a DL RS or an SRS resource. In one example, if the source RS is an SRS resource, the usage of its associated SRS resource set is set to 'beamManagement'.

The SRI field may indicate a value that is mapped to a subset of SRS-nCB resources in an SRS-nCB resource set. The subset of SRS-nCB resources is represented as the associated SRS-nCB. The associated SRS-nCB provides information for deriving the TPMI(s) and the number of spatial layers to be applied for the scheduled PUSCH transmission. On the other hand, the SRS-nCB resource set may be used for channel sounding to derive the SRI field value configured by a gNB.

The associated SRS-nCB indicated by the SRI field may be associate with same UL transmission beam information and optionally same UE panel as that indicated by the source RS in the UL-TCI-State.

There may be an SRS resource set whose usage is set to 'noncodebook'. The associated SRS-nCB may be derived from the SRS resource set.

There may be multiple SRS resource sets whose usages are set to 'noncodebook', but each of the SRS resource sets has different time domain patterns. The associated SRS-nCB may be derived from the SRS-nCB resource sets with the same time domain pattern.

There may be multiple SRS resource sets whose usages are set to 'noncodebook'. The associated SRS-nCB may be derived based on the source RS implicitly.

The SRS-nCB resource set may be derived from the source RS indicated by the UL-TCI-State IE. In one example, the associated SRS-nCB may be derived from an SRS resource set that is associated with a UE panel. Thus, the SRS-nCB resource set is derived based on the associated UE panel that is derived from the source RS.

The associated SRS-nCB may be provided with a UL-TCI-State IE for deriving transmission beam information. The transmission beam information of the associated SRS-nCB is derived based on a CSI-RS configured for the SRS-nCB resource set. It is noted that the transmission beam information of the associated SRS-nCB is constrained to be the same as that of the source SR.

In Method 1, a source RS indicated in a UL-TCI field (e.g., a UL-TCI-State IE) of a scheduling DCI may be SRS-bM resource or DL RS (e.g., CSI-RS or SSB). The source RS may be used to derive a UE panel, in addition to deriving transmission beam information. The derived UE panel may be used to implicitly derive an SRS-nCB resource set for channel sounding. The associated SRS-nCB indicated in an SRI field of a scheduling DCI is derived from the SRS-nCB resource set. It is noted that a UE panel and transmission beam information derived from the associated SRS-nCB is the same as those indicated by the source RS. This method is illustrated in FIG. 5.

Figure 5:
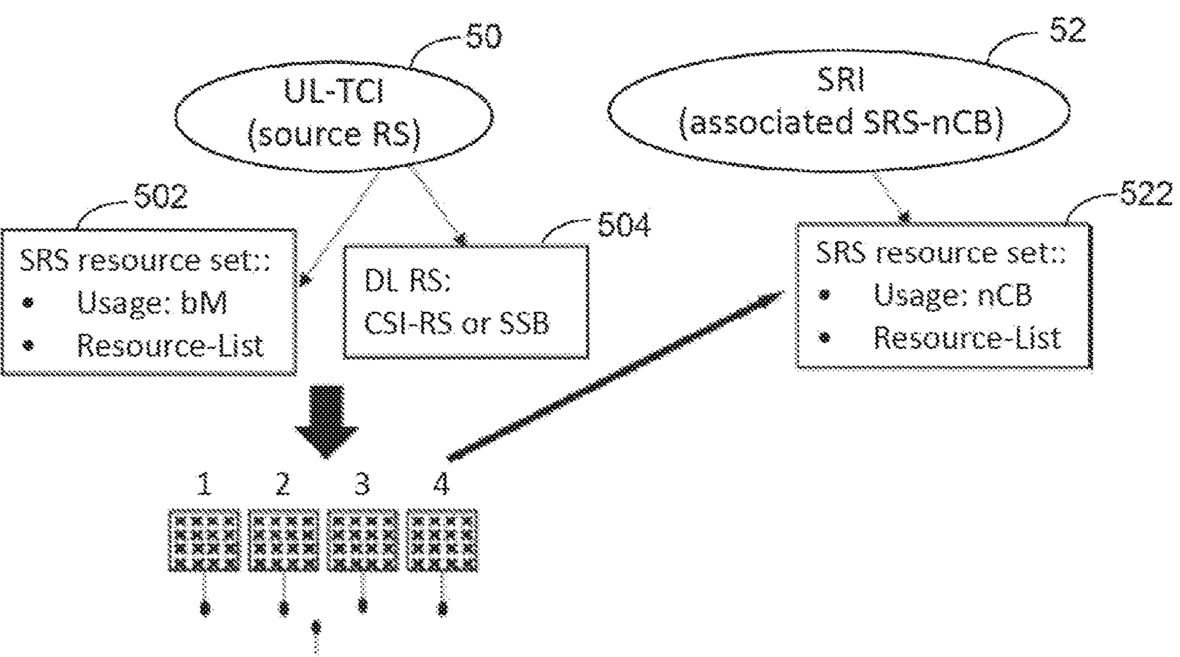
FIG. 5 is a diagram illustrating a source RS for non-codebook based PUSCH transmission, according to an implementation of the present disclosure.

FIG. 5 is a schematic diagram illustrating a source RS for non-codebook based PUSCH transmission, according to an implementation of the present disclosure. As illustrated in FIG. 5, a source RS 50 indicated in the UL-TCI field may be an SRS-bM resource 502 or a DL RS 504 (e.g., CSI-RS or SSB). The source RS 50 may be used to derive a UE panel (e.g., UE panel 2), in addition to deriving transmission beam information. The derived UE panel 2 may be used to implicitly derive an SRS-nCB resource set 522 that is used for channel sounding for determining the associated SRS-nCB indicated in an SRI field 52. The associated SRS-nCB indicated by the SRI field 52 is derived from the SRS-nCB resource set 522. The associated SRS-nCB and/or the SRS-nCB resource set assume the same UE panel and transmission beam information as indicated by the source RS.

In other words, a UL-TCI field and an SRI field are jointly used for indicating a non-codebook based PUSCH transmission. The UL-TCI field indicates a source RS for providing transmission beam information and optionally for providing a UE panel. The SRI field indicates an associated SRS-nCB for providing information of precoder and/or the number of spatial layers. The SRI field length may be extended, compared to the 3GPP Rel-15/16, for identifying a set of SRS-nCB resource(s), which may implicitly indicate a UE panel. It is noted that the associated SRS-nCB may be associated with the source RS indicated in UL-TCI field implicitly. For example, the source RS is associated with an SRS resource set that is implicitly associated with a UE panel, and the associated SRS-nCB is also associated with the same UE panel.

Method 2. A recursive source RS indication for non-codebook based PUSCH transmission.

In this method, an SRI field in a scheduling DCI (e.g., DCI format 0_1 or 0_2) is used to provide information on TPMI(s) and the number of spatial layers. It is noted that transmission beam information for a non-codebook based PUSCH transmission may be derived implicitly from the SRI field. The SRI field provides an indication to SRS-nCB resource(s).

The SRI field may indicate a value that is mapped to a subset of SRS-nCB resources in an SRS-nCB resource set. The subset of SRS-nCB resources is represented as the associated SRS-nCB. The associated SRS-nCB provides information for deriving the TPMI(s) and the number of spatial layers to be applied for the scheduled PUSCH transmission. On the other hand, the associated SRS-nCB resource set may be used for channel sounding to derive the SRI field value configured by a gNB.

The associated SRS-nCB may be associated with transmission beam information and optionally a UE panel.

The associated SRS-nCB may include information of a source RS for deriving the transmission beam information. In one example, the source RS is provided via spatialRelationInfo. In another example, the source RS is provided via a UL-TCI-State IE. Yet in other examples, the source RS is provided as a CSI-RS. In the context of 3GPP Rel-15/16, the CSI-RS provided in an SRS resource set configuration, is dependent on the time domain pattern of the SRS resource set. In other examples, the source RS may be a DL RS or an SRS resource. If the source RS is an SRS resource, the usage of the SRS resource set is set to 'beamManagement'.

There may be an SRS resource set whose usage is set to 'noncodebook'. The associated SRS-nCB may be derived from the SRS-nCB resource set.

There may be multiple SRS resource sets whose usages are set to 'noncodebook', while each of the SRS resource sets has a different time domain pattern. The associated SRS-nCB may be derived from the SRS-nCB resource set with the same time domain pattern.

There may be multiple SRS resource sets whose usages are set to 'noncodebook'. The associated SRS-nCB may be derived based on the source RS implicitly.

The SRS-nCB resource set may be derived from the source RS. In one example, the associated SRS-nCB may be derived from an SRS resource set that is associated with a UE panel. Thus, the SRS-nCB resource set is derived based on the associated UE panel that is derived from the source RS.

In Method 2, an associated SRS-nCB indicated in an SRI field of a scheduling DCI is further configured with a source RS via a UL-TCI-State IE, spatialRelationInfo, or a CSI-RS. The source RS may be used to derive a UE panel, in addition to deriving transmission beam information. The derived UE panel may be used to implicitly derive an SRS-nCB resource set for channel sounding. The associated SRS-nCB indicated by the SRI field of the scheduling DCI is derived from the SRS-nCB resource set. This method is illustrated in FIG. 6.

Figure 6:
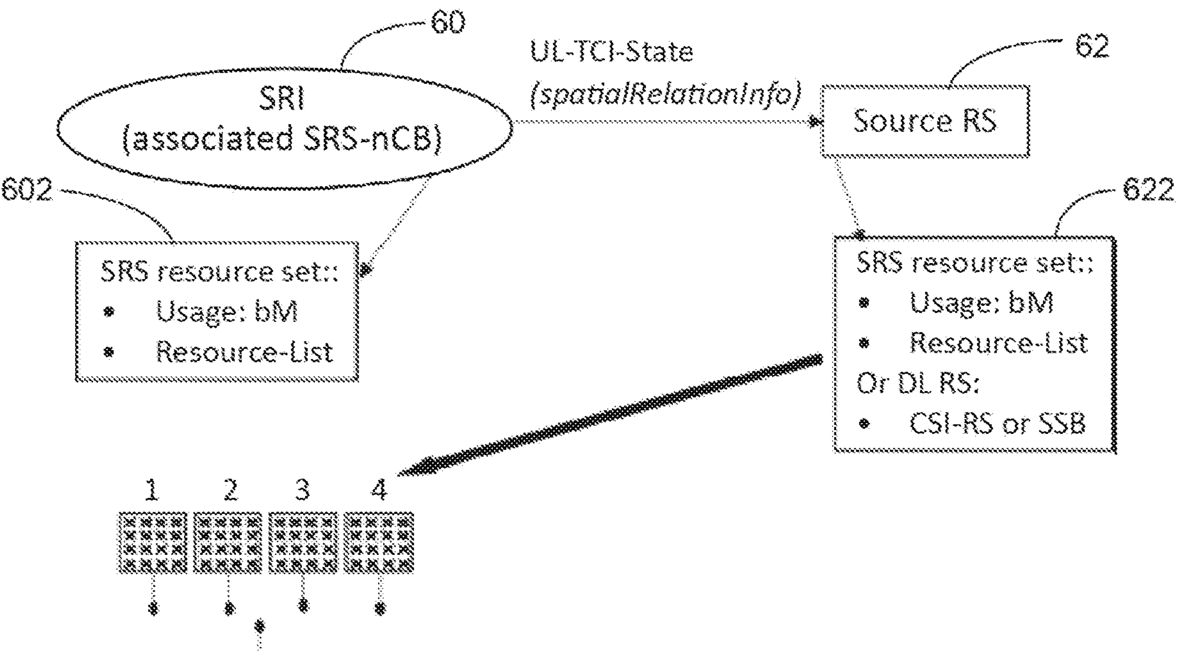
FIG. 6 is a diagram illustrating a recursive source RS for non-codebook based PUSCH transmission, according to an implementation of the present disclosure.

FIG. 6 is a schematic diagram illustrating a recursive source RS for non-codebook based PUSCH transmission, according to an implementation of the present disclosure. As illustrated in FIG. 6, an associated SRS-nCB 60 indicated in an SRI field is further configured with a source RS 62 via a UL-TCI-State IE, spatialRelationInfo, or a CSI-RS. The source RS 62 is used to derive a UE panel (e.g., UE panel 2) based on an associated SRS resource set 622 (e.g., an SRS-bM resource, an SSB, or a CSI-RS resource), in addition to deriving transmission beam information. The derived UE panel 2 may be used to implicitly derive the SRS-nCB resource set 602 that is used for channel sounding. The associated SRS-nCB 60 indicated by the SRI field is derived from the SRS-nCB resource set 602.

In other words, an SRI field is used for indicating a non-codebook based PUSCH transmission. The SRI field indicates a set of SRS-NCB resource(s) for providing information of precoder and the number of spatial layers. The SRI field length may be extended, compared to the 3GPP Rel-15/16, for identifying a set of SRS-nCB resource(s) (e.g., associated SRS-nCB), which may implicitly indicate a UE panel. The associated SRS-nCB is further provided with a UL-TCI-State for deriving transmission beam information. The transmission beam information derived from the associated SRS-nCB is constrained to be the same as the transmission beam information derived from the source RS. It is noted that the UL-TCI-State may be configured per set of SRS-NCB resource(s). The UL-TCI-State may also implicitly indicate a UE panel.

UL-TCI Based Indication for Codebook-Based PUSCH Transmission

Two transmission schemes or modes are supported for PUSCH as specified in the 3GPP TS 38.213 V15.6.0 and TS 38.214 V15.6.0: codebook based transmission and non-codebook based transmission. For both transmission modes, a PUSCH transmission may be scheduled by DCI format 0_1 or DCI format 0_2, as specified in the 3GPP TS 38.212 V16.0.0.

For the codebook based transmission scheme, a scheduling DCI may provide, among others, information on UL transmission beam, TPMI, and the number of spatial layers used for the PUSCH transmission. The transmission beam information is notified via spatial relation information in an SRI field. The TPMI may notify transmit precoder to be applied for a scheduled PUSCH transmission. The indication of TPMI may be accompanied with the number of spatial layers.

With UL-TCI based indication, a source RS which provides transmission beam information or spatial transmission filter information to be applied for transmitting a target RS or a target channel may be indicated in different means.

In one implementation, a source RS is indicated by UL-TCI for codebook-based PUSCH transmission. The transmission beam information may be provided via a 'UL-TCI' field in a scheduling DCI, whereas the TPMI(s) and the number of spatial layers may be provided in the 'precoding information and number of layers' field in a scheduling DCI (e.g., DCI format 0_1 or 0_2). The 'UL-TCI' field provides an indication to a UL-TCI-State. In this case, the SRI field that indicates directly an SRS-CB resource may not be present.

The UL-TCI-State provides a source RS for deriving transmission beam information. An UE panel for the scheduled PUSCH transmission may be indicated, optionally or implicitly by the source RS. The source RS may be a DL RS or an SRS resource (e.g., SRS-bM resource).

The indication based on 'precoding information and number of layers' field may provide the TPMI(s) and the number of spatial layers based on an associated SRS-CB. The associated SRS-CB may be used for channel sounding to derive 'precoding information and number of layers'. The associated SRS-CB may be associated with the same transmission beam information and optionally/implicitly the same UE panel as indicated by the UL-TCI-State.

In one example, the derivation of the associated SRS-CB is not required for the associated PUSCH transmission.

The associated SRS-CB may be derived from the source RS provided in the UL-TCI-State.

There may be multiple SRS resource sets whose usages are set to 'codebook'. An SRS resource set containing the associated SRS-CB is associated with a UE panel. Thus, the SRS resource set is derived based on the associated UE panel that is derived from the source RS. The associated SRS-CB is derived by finding an SRS resource in the SRS resource set that has the same transmission beam information for a recent transmission.

There may be an SRS resource set whose usage is set to 'codebook'. The associated SRS-CB is derived by finding an SRS resource in the SRS resource set that has the same transmission beam information for a recent transmission.

There may be multiple SRS resource sets whose usages are set to 'codebook', while each of the SRS resource sets has a different time domain pattern. The associated SRS-CB may be derived by finding an SRS resource in the SRS resource sets with the same time domain pattern.

The associated SRS-CB may be provided by a UL-TCI-State IE or spatialRelationInfo for deriving the transmission beam information.

The transmission beam information derived here may be constrained to be the same as that derived from the source RS.

The UL-TCI-State IE may implicitly indicate a UE panel.

Figure 7:
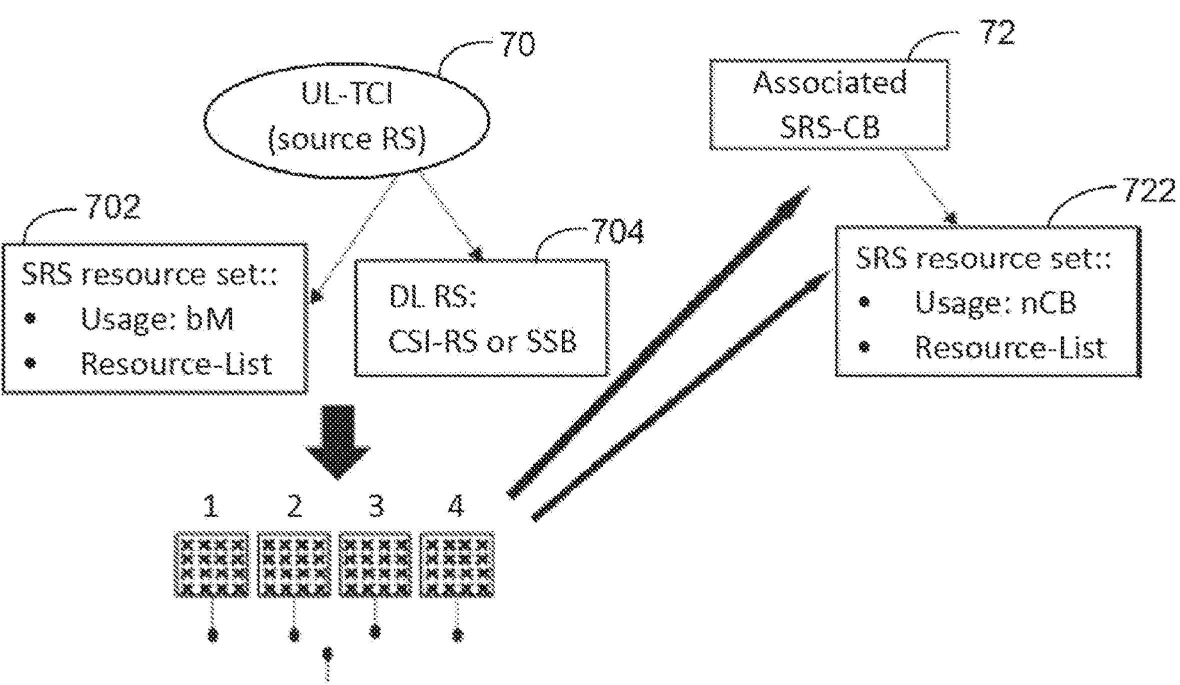
FIG. 7 is a diagram illustrating a source RS for codebook-based PUSCH transmission, according to an implementation of the present disclosure.

FIG. 7 is a schematic diagram illustrating a source RS for codebook-based PUSCH transmission, according to an implementation of the present disclosure. As illustrated in FIG. 7, a source RS 70 indicated in a UL-TCI field (e.g., a UL-TCI IE) may be an SRS-bM resource 702 or a DL RS 704. The source RS 70 may be used to derive a UE panel (e.g., UE panel 2), in addition to deriving transmission beam information. The derived UE panel 2 may be used to implicitly derive an associated SRS-CB 72 or SRS-CB resource set 722. The associated SRS-CB 72 assumes the same UE panel and transmission beam information as indicated by the source RS.

In one implementation, a recursive source RS is indicated by the UL-TCI field for codebook-based PUSCH transmission. The transmission beam information may be derived via a 'UL-TCI' field in a scheduling DCI, whereas the TPMI(s) and the number of spatial layers may be provided in the 'precoding information and number of layers' field in a scheduling DCI (e.g., DCI format 0_1 or 0_2). The 'UL-TCI' field provides indication to a UL-TCI-State whose beam-referenceSignal is set to an SRS-CB resource.

The UL-TCI-State may provide an SRS-CB resource, which is termed 'associated SRS-CB' in this subsection. The associated SRS-CB may be further provided with a UL-TCI-State or spatialRelationInfo for indicating a source RS for deriving transmission beam information.

The source RS indicated by the UL-TCI-State or spatialRelationInfo may implicitly indicate a UE panel.

In one example, the source RS is an SRS resource, with usage of its associated SRS resource set configured to 'beamMangement'.

The indication based on 'precoding information and number of layers' field may provide the TPMI(s) and the number of spatial layers based on the associated SRS-CB. The associated SRS-CB may be used for channel sounding to derive 'precoding information and number of layers', whose transmission is also based on the transmission beam information and the UE panel as indicated by the source RS.

Figure 8:
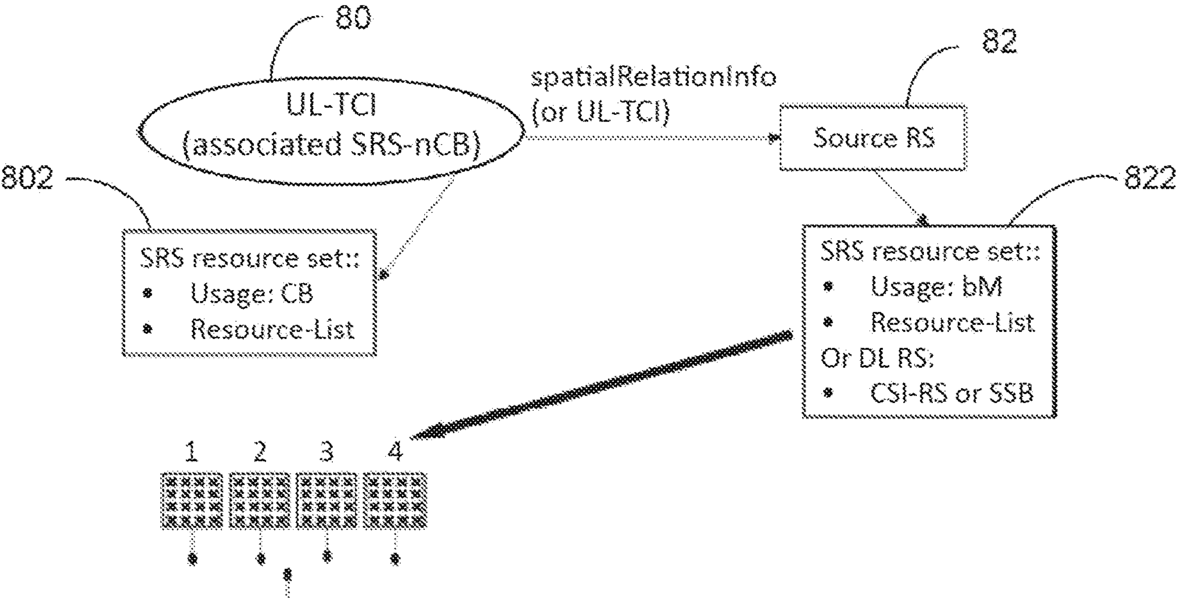
FIG. 8 is a diagram illustrating a recursive source RS for codebook-based PUSCH transmission, according to an implementation of the present disclosure.

FIG. 8 is a schematic diagram illustrating a recursive source RS for codebook-based PUSCH transmission, according to an implementation of the present disclosure. As illustrated in FIG. 8, an associated SRS-CB 80 of a UL-TCI field in a scheduling DCI may indicate an SRS-CB resource set 802, which is used for deriving transmit parameters such as the TPMI(s) and/or the number of transmission layers for the scheduled PUSCH(s). The SRS-CB resource set 802 may be associated with a source RS 82 indicated by the UL-TCI-State or spatialRelationInfo for deriving a UE panel (e.g., UE panel 2), in addition to deriving transmission beam information. The source RS 82 may include an SRS resource set 822 (e.g., SRS-bM resource or DL RS).

In one implementation, a recursive source RS is indicated by SRI for codebook-based PUSCH transmission. The transmission beam information may be derived via an 'SRI' field in a scheduling DCI, whereas the TPMI(s) and the number of spatial layers may be provided in the precoding information and number of layers' field in a scheduling DCI (e.g., DCI format 0_1 or 0_2). The 'SRI' field provides an indication to an SRS-CB resource.

The SRI may provide an SRS-CB resource, which is termed 'associated SRS-CB' in this subsection. The associated SRS-CB may be further provided with a UL-TCI-State or spatialRelationInfo for indicating a source RS for deriving its transmission beam information.

The source RS indicated by the UL-TCI-State or spatialRelationInfo may implicitly indicate a UE panel.

In one example, the source RS is an SRS resource, with usage of its associated resource set configured to 'beamMangement'.

The indication based on 'precoding information and number of layers' field may provide the TPMI(s) and the number of spatial layers based on the associated SRS-CB. The associated SRS-CB may be used for channel sounding to derive 'precoding information and number of layers', whose transmission is also based on the transmission beam information and the UE panel as indicated by the source RS.

There may be an SRS resource set whose usage is set to 'codebook'. The SRI field provide an indication to the SRS resource set for determining the associated SRS-CB.

There may be multiple SRS resource sets whose usage are set to 'codebook'. The SRI field provide an indication for determining an SRS resource in one of the SRS resource sets as the associated SRS-CB.

Figure 9:
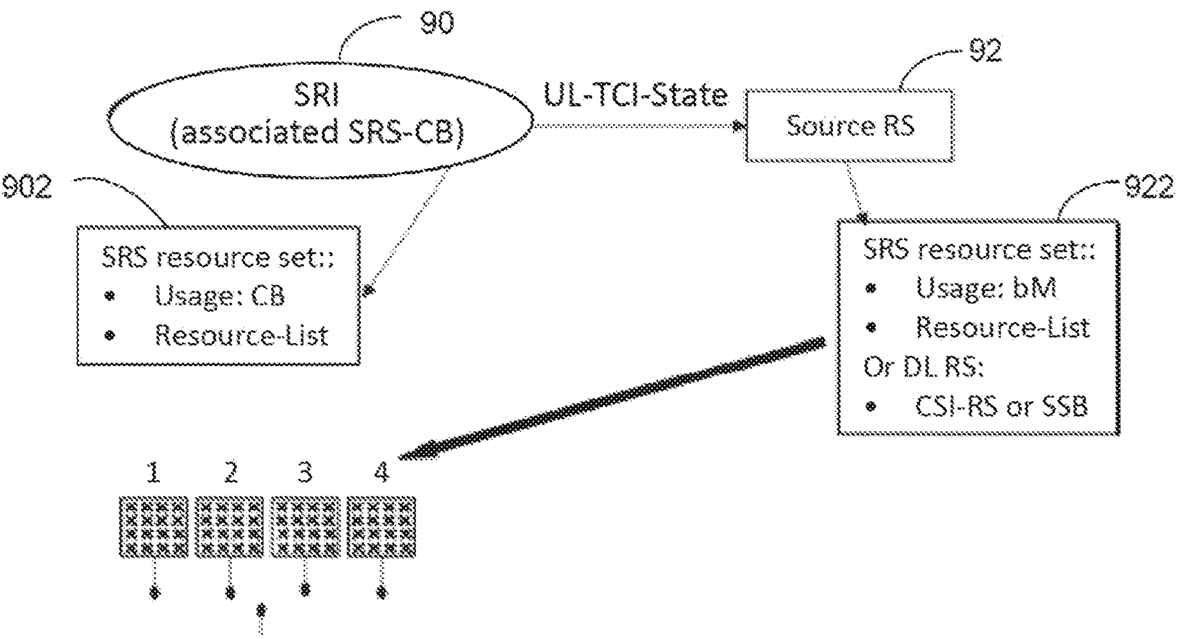
FIG. 9 is a diagram illustrating a recursive source RS for codebook-based PUSCH transmission, according to an implementation of the present disclosure.

FIG. 9 is a schematic diagram illustrating a recursive source RS for codebook-based PUSCH transmission, according to an implementation of the present disclosure. As illustrated in FIG. 9, an associated SRS-CB 90 of an SRI field in a scheduling DCI may indicate an SRS-CB resource set 902, which is used for deriving transmit parameters such as the TPMI(s) and/or the number of TX layers for a scheduled PUSCH(s). The associated SRS-CB 90 may be associated with a source RS 92 indicated by the UL-TCI-State. The source RS 92 may include an SRS resource set 922 (e.g., SRS-bM resource or DL RS), and is used to derive a UE panel (e.g., UE panel 2), in addition to deriving transmission beam information.

Figure 10:
FIG. 10 is a flowchart illustrating a method of performing a non-codebook based PUSCH transmission for a user equipment (UE), according to an implementation of the present disclosure.
Figure 10:
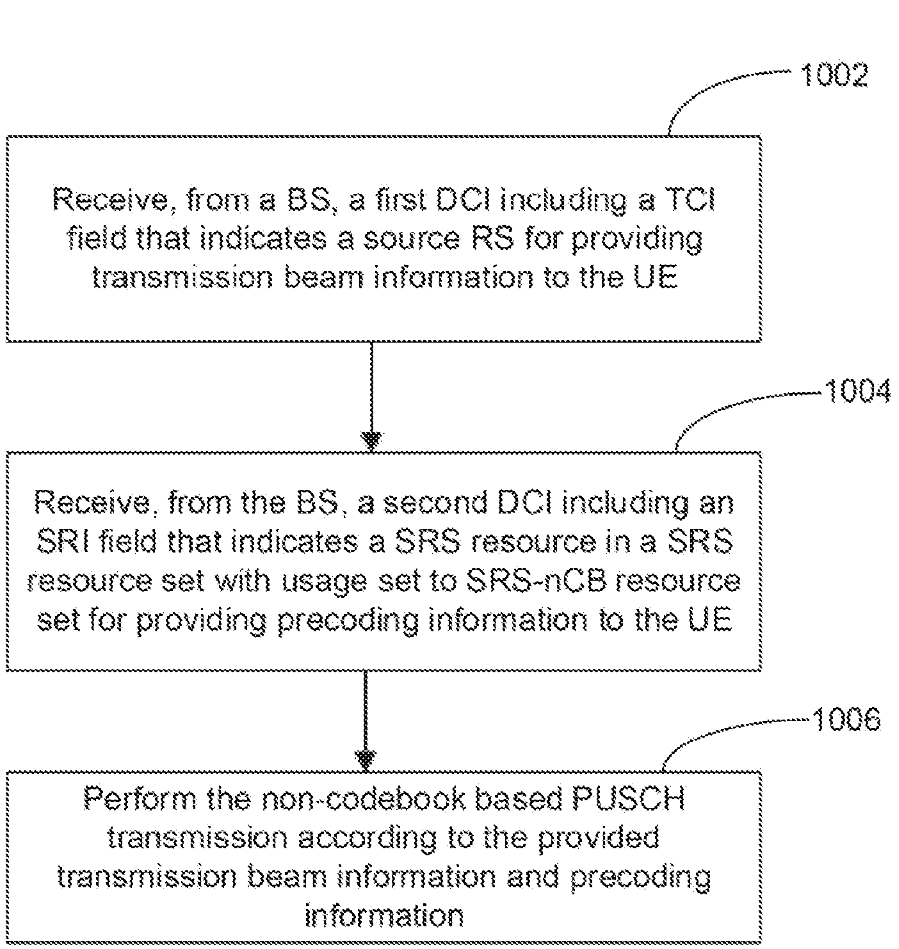

FIG. 10 is a flowchart illustrating a method 1000 for a UE to perform a non-codebook based PUSCH transmission, according to an implementation of the present disclosure. In action 1002, the UE receives, from a BS, a first DCI including a TCI field (e.g., an UL-TCI-State IE) that indicates a source RS for providing transmission beam information to the UE. In action 1004, the UE receives, from the BS, a second DCI including an SRI field that indicates an SRS resource in an SRS resource set with usage set to SRS-nCB resource set for providing precoding information to the UE. In action 1006, the UE performs the non-codebook based PUSCH transmission according to the provided transmission beam information and precoding information.

In one implementation, the first DCI and the second DCI are different DCIs.

In one implementation, transmission beam information associated with the SRS-nCB resource set is the same as the transmission beam information provided by the source RS.

In one implementation, the transmission beam information associated with the SRS-nCB resource set is determined based on a CSI-RS resource configured by the BS.

In one implementation, the SRS resource is configured with a spatial relation information for deriving the transmission beam information for a transmission of the SRS resource.

In one implementation, the source RS is an SRS resource of an SRS resource set with usage set to SRS-bM resource set, a CSI-RS resource or an SSB.

In one implementation, the source RS is configured with a spatial relation information for deriving the transmission beam information.

In one implementation, the UE may derive panel information for the non-codebook based PUSCH transmission according to the source RS. The derived panel information is used for at least one of a transmission of the SRS resource and the non-codebook based PUSCH transmission.

Figure 11:
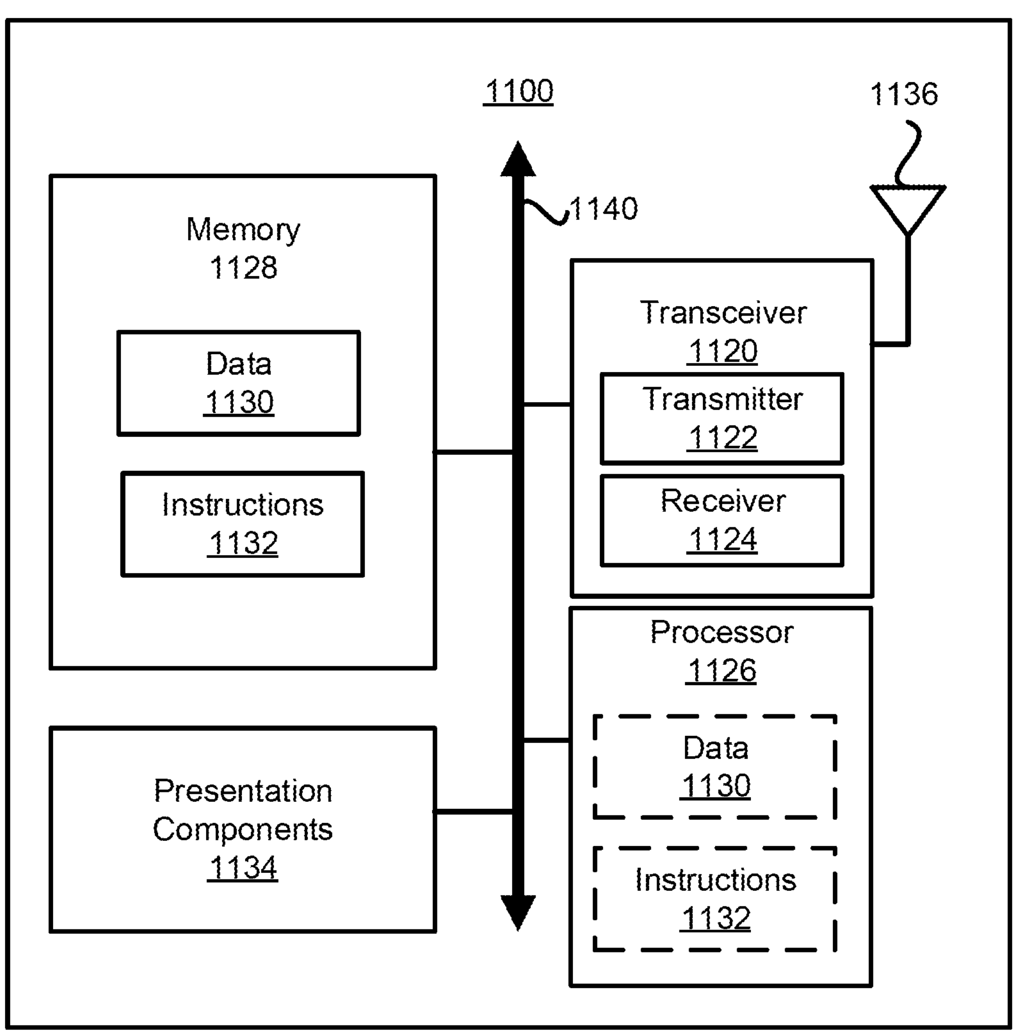
FIG. 11 is a block diagram illustrating a node for wireless communication, according to an implementation of the present disclosure.

FIG. 11 is a block diagram illustrating a node 1100 for wireless communication, according to an implementation of the present disclosure.

As illustrated in FIG. 11, the node 1100 may include a transceiver 1120, a processor 1126, a memory 1128, one or more presentation components 1134, and at least one antenna 1136. The node 1100 may also include a Radio Frequency (RF) spectrum band module, a BS communications module, a network communications module, and a system communications management module, input/output (I/O) ports, I/O components, and a power supply (not illustrated in FIG. 11).

Each of these components may be in communication with each other, directly or indirectly, over one or more buses 1140. The node 1100 may be a UE or a BS that performs various disclosed functions illustrated in FIG. 10.

The transceiver 1120 may include a transmitter 1122 (with transmitting circuitry) and a receiver 1124 (with receiving circuitry) and may be configured to transmit and/or receive time and/or frequency resource partitioning information. The transceiver 1120 may be configured to transmit in different types of subframes and slots including, but not limited to, usable, non-usable and flexibly usable subframes and slot formats. The transceiver 1120 may be configured to receive data and control channels.

The node 1100 may include a variety of computer-readable media. Computer-readable media may be any media that can be accessed by the node 1100 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 1128 may include computer-storage media in the form of volatile and/or non-volatile memory. The memory 1128 may be removable, non-removable, or a combination thereof. For example, the memory 1128 may include solid-state memory, hard drives, optical-disc drives, etc. As illustrated in FIG. 11, the memory 1128 may store computer-readable and/or computer-executable instructions 1132 (e.g., software codes) that are configured to, when executed, cause the processor 1126 (e.g., processing circuitry) to perform various disclosed functions. Alternatively, the instructions 1132 may not be directly executable by the processor 1126 but may be configured to cause the node 1100 (e.g., when compiled and executed) to perform various disclosed functions.

The processor 1126 may include an intelligent hardware device, a central processing unit (CPU), a microcontroller, an ASIC, etc. The processor 1126 may include memory. The processor 1126 may process the data 1130 and the instructions 1132 received from the memory 1128, and information through the transceiver 1120, the baseband communications module, and/or the network communications module. The processor 1126 may also process information to be sent to the transceiver 1120 for transmission via the antenna 1136, to the network communications module for transmission to a CN.

One or more presentation components 1134 may present data to a person or other devices. Presentation components 1134 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of performing a non-codebook based physical uplink shared channel (PUSCH) transmission by a user equipment (UE), the method comprising:
- receiving, from a base station (BS), first downlink control information (DCI) including a transmission configuration indication (TCI) field that indicates a source reference signal (RS) for providing transmission beam information to the UE;
- receiving, from the BS, second DCI including a sounding reference signal (SRS) resource indication (SRI) field that indicates an SRS resource in an SRS resource set with usage set to non-codebook (SRS-nCB) resource set for providing precoding information to the UE; and
- performing the non-codebook based PUSCH transmission according to the transmission beam information and the precoding information, wherein:
  - the first DCI is different from the second DCI, and
  - transmission beam information associated with the SRS-nCB resource set is the same as the transmission beam information provided by the source RS.

2. The method of claim 1, wherein the transmission beam information associated with the SRS-nCB resource set is determined based on a channel state information reference signal (CSI-RS) resource configured by the BS.

3. The method of claim 1, wherein the SRS resource is configured with spatial relation information for deriving the transmission beam information associated with the SRS-nCB resource set for a transmission of the SRS resource.

4. The method of claim 1, wherein the source RS is an SRS resource of an SRS resource set with usage set to a beamManagement (SRS-bM) resource set, a channel state information reference signal (CSI-RS) resource, or a synchronization signal block (SSB).

5. The method of claim 1, wherein the source RS is configured with spatial relation information for deriving the transmission beam information provided to the UE.

6. The method of claim 1, further comprising:
- deriving panel information for the non-codebook based PUSCH transmission according to the source RS, wherein the derived panel information is used for at least one of a transmission of the SRS resource and the non-codebook based PUSCH transmission.

7. A user equipment (UE) for performing a non-codebook based physical uplink shared channel (PUSCH) transmission, the UE comprising:
- at least one processor; and
- at least one non-transitory computer-readable medium coupled to the at least one processor and storing one or more computer-executable instructions that, when executed by the at least one processor, cause the UE to:
  - receive, from a base station (BS), first downlink control information (DCI) including a transmission configuration indication (TCI) field that indicates a source reference signal (RS) for providing transmission beam information to the UE;
  - receive, from the BS, second DCI including a sounding reference signal (SRS) resource indication (SRI) field that indicates an SRS resource in an SRS resource set with usage set to non-codebook (SRS-nCB) resource set for providing precoding information to the UE; and
  - perform the non-codebook based PUSCH transmission according to the transmission beam information and the precoding information, wherein:
  - the first DCI is different from the second DCI, and
  - transmission beam information associated with the SRS-nCB resource set is the same as the transmission beam information provided by the source RS.

8. The UE of claim 7, wherein the transmission beam information associated with the SRS-nCB resource set is determined based on a channel state information reference signal (CSI-RS) resource configured by the BS.

9. The UE of claim 7, wherein the SRS resource is configured with spatial relation information for deriving the transmission beam information associated with the SRS-nCB resource set for a transmission of the SRS resource.

10. The UE of claim 7, wherein the source RS is an SRS resource of an SRS resource set with usage set to a beam-Management (SRS-bM) resource set, a channel state information reference signal (CSI-RS) resource, or a synchronization signal block (SSB).

11. The UE of claim 7, wherein the source RS is configured with a spatial relation information for deriving the transmission beam information provided to the UE.

12. The UE of claim 7, wherein the one or more computer-executable instructions, when executed by the at least one processor, further cause the UE to:
- derive panel information for the non-codebook based PUSCH transmission according to the source RS, wherein the derived panel information is used for at least one of a transmission of the SRS resource and the non-codebook based PUSCH transmission.

* * * * *